(12) United States Patent
Hassan et al.

(10) Patent No.: US 7,933,344 B2
(45) Date of Patent: Apr. 26, 2011

(54) OFDMA BASED ON COGNITIVE RADIO

(75) Inventors: Amer A. Hassan, Kirkland, WA (US);
Christian Huitema, Clyde Hill, WA (US)

(73) Assignee: Mircosoft Corporation, Redmond, WA (US)

(*) Notice: Subject to any disclaimer, the term of this patent is extended or adjusted under 35 U.S.C. 154(b) by 1283 days.

(21) Appl. No.: 11/410,969

(22) Filed: Apr. 25, 2006

(65) Prior Publication Data
US 2007/0248173 A1   Oct. 25, 2007

(51) Int. Cl.
*H04K 1/00*   (2006.01)

(52) U.S. Cl. ........ 375/260; 375/267; 375/222; 375/130; 370/206; 370/208; 370/437; 370/311; 370/465; 455/423; 455/450; 455/453

(58) Field of Classification Search .......... 375/260, 375/267, 130, 222; 370/206, 437, 208, 311, 370/465; 455/423, 450, 453
See application file for complete search history.

(56) References Cited

U.S. PATENT DOCUMENTS

| | | | |
|---|---|---|---|
| 4,210,780 A | 7/1980 | Hopkins et al. | |
| 5,504,775 A | 4/1996 | Chouly et al. | |
| 5,790,516 A | 8/1998 | Gudmundson et al. | |
| 5,867,478 A | 2/1999 | Baum et al. | |
| 6,175,550 B1 | 1/2001 | van Nee | |
| 6,304,611 B1 | 10/2001 | Miyashita et al. | |
| 6,553,534 B2 | 4/2003 | Yonge et al. | |
| 6,609,039 B1 | 8/2003 | Schoen | |
| 6,654,431 B1 | 11/2003 | Barton et al. | |
| 6,726,297 B1 | 4/2004 | Uesugi | |
| 6,763,072 B1 | 7/2004 | Matsui et al. | |
| 6,810,006 B2 | 10/2004 | Michon et al. | |
| 6,870,808 B1 | 3/2005 | Liu et al. | |
| 6,882,851 B2 | 4/2005 | Sugar et al. | |
| 6,904,283 B2 | 6/2005 | Li et al. | |
| 6,934,246 B2 | 8/2005 | Park | |
| 6,934,340 B1 | 8/2005 | Dollard | |
| 6,952,454 B1 | 10/2005 | Jalali et al. | |

(Continued)

FOREIGN PATENT DOCUMENTS
CN   1468486 A   4/2004
(Continued)

OTHER PUBLICATIONS
International Search Report from corresponding International Application No. PCT/US2007/010020 filed Apr. 25, 2007.
(Continued)

*Primary Examiner* — Eva Y Puente
(74) *Attorney, Agent, or Firm* — Wolf, Greenfield & Sacks, P.C.

(57) ABSTRACT

A multiuser scheme allowing for a number of users, sets of user, or carriers to share one or more channels is provided. In the invention, the available channel bandwidth is subdivided into a number of equal-bandwidth subchannels according to standard OFDM practice. The transmitter is informed by an application that it needs to transmit data a particular rate. The transmitter determines the minimum number of subchannels and maximum energy (or noise) threshold for each subchannel necessary to achieve that data rate and selects a set of subchannels matching those requirements. The subchannels need not be contiguous in the spectrum or belong to the same channel. Once the transmitter has selected the required number of subchannels, it begins transmitting simultaneously on those subchannels across the entire bandwidth used by those subchannels.

19 Claims, 4 Drawing Sheets

U.S. PATENT DOCUMENTS

| | | | |
|---|---|---|---|
| 6,961,388 B2 | 11/2005 | Ling et al. | |
| 6,976,202 B1 | 12/2005 | Rezvani et al. | |
| 6,987,729 B1 | 1/2006 | Gopalakrishnan et al. | |
| 7,012,883 B2 | 3/2006 | Jalali et al. | |
| 7,020,071 B2 | 3/2006 | Mujtaba | |
| 7,020,073 B2 | 3/2006 | Kadous et al. | |
| 7,043,023 B2 | 5/2006 | Watanabe et al. | |
| 7,043,681 B2 | 5/2006 | Kroeger et al. | |
| 7,047,032 B2 | 5/2006 | Yun | |
| 7,072,413 B2* | 7/2006 | Walton et al. | 375/267 |
| 7,075,967 B2 | 7/2006 | Struhsaker et al. | |
| 7,076,246 B2 | 7/2006 | Chitrapu | |
| 7,126,984 B2* | 10/2006 | Wang | 375/222 |
| 7,151,925 B2 | 12/2006 | Ting et al. | |
| 7,164,649 B2 | 1/2007 | Walton et al. | |
| 7,206,350 B2 | 4/2007 | Korobkov et al. | |
| 7,206,840 B2 | 4/2007 | Choi et al. | |
| 2002/0141446 A1 | 10/2002 | Koga | |
| 2002/0157058 A1 | 10/2002 | Ariel | |
| 2002/0188723 A1 | 12/2002 | Choi et al. | |
| 2003/0026200 A1 | 2/2003 | Fu et al. | |
| 2003/0058786 A1 | 3/2003 | Sato et al. | |
| 2003/0123383 A1 | 7/2003 | Korobkov et al. | |
| 2003/0223354 A1* | 12/2003 | Olszewski | 370/208 |
| 2004/0005010 A1 | 1/2004 | He et al. | |
| 2004/0008618 A1 | 1/2004 | Shirakata et al. | |
| 2004/0027997 A1 | 2/2004 | Terry et al. | |
| 2004/0029575 A1 | 2/2004 | Mehta | |
| 2004/0151108 A1 | 8/2004 | Blasco Claret | |
| 2004/0151109 A1 | 8/2004 | Batra et al. | |
| 2004/0252775 A1 | 12/2004 | Park | |
| 2004/0252781 A1 | 12/2004 | Park | |
| 2005/0002325 A1 | 1/2005 | Giannakis et al. | |
| 2005/0025039 A1 | 2/2005 | Hwang et al. | |
| 2005/0027789 A1 | 2/2005 | Luo et al. | |
| 2005/0063345 A1 | 3/2005 | Wu et al. | |
| 2005/0078759 A1* | 4/2005 | Zhang | 375/260 |
| 2005/0099937 A1 | 5/2005 | Oh et al. | |
| 2005/0111462 A1 | 5/2005 | Walton et al. | |
| 2005/0117661 A1 | 6/2005 | Kim | |
| 2005/0130684 A1 | 6/2005 | Kim et al. | |
| 2005/0141649 A1 | 6/2005 | Tanabe | |
| 2005/0152466 A1* | 7/2005 | Maltsev et al. | 375/260 |
| 2005/0157670 A1 | 7/2005 | Tang et al. | |
| 2005/0160428 A1 | 7/2005 | Ayachitula et al. | |
| 2005/0197132 A1 | 9/2005 | Lee et al. | |
| 2005/0228850 A1 | 10/2005 | Zhu et al. | |
| 2005/0237989 A1 | 10/2005 | Ahn et al. | |
| 2005/0245197 A1 | 11/2005 | Kadous et al. | |
| 2006/0009209 A1 | 1/2006 | Rieser et al. | |
| 2006/0034382 A1 | 2/2006 | Ozluturk et al. | |
| 2006/0045001 A1 | 3/2006 | Jalali | |
| 2006/0046716 A1 | 3/2006 | Hofstaedter et al. | |
| 2006/0078059 A1* | 4/2006 | Ok et al. | 375/260 |
| 2006/0083210 A1 | 4/2006 | Li et al. | |
| 2006/0128318 A1 | 6/2006 | Agarossi et al. | |
| 2006/0135075 A1 | 6/2006 | Tee et al. | |
| 2006/0154691 A1 | 7/2006 | Tang et al. | |
| 2006/0159120 A1 | 7/2006 | Kim | |
| 2006/0171445 A1 | 8/2006 | Batra et al. | |
| 2006/0188031 A1 | 8/2006 | Liu | |
| 2006/0193295 A1 | 8/2006 | White et al. | |
| 2006/0211387 A1 | 9/2006 | Pisek et al. | |
| 2006/0211395 A1 | 9/2006 | Waltho | |
| 2006/0250944 A1 | 11/2006 | Hong et al. | |
| 2006/0269005 A1 | 11/2006 | Laroia et al. | |
| 2006/0287001 A1 | 12/2006 | Budampati et al. | |
| 2007/0009056 A1 | 1/2007 | Yeon et al. | |
| 2007/0016413 A1 | 1/2007 | Seo et al. | |
| 2007/0055501 A1 | 3/2007 | Aytur et al. | |
| 2007/0078924 A1 | 4/2007 | Hassan et al. | |
| 2007/0133387 A1* | 6/2007 | Arslan et al. | 370/206 |
| 2008/0232340 A1 | 9/2008 | Wan et al. | |

FOREIGN PATENT DOCUMENTS

| | | |
|---|---|---|
| EP | 1 156 598 A2 | 11/2001 |
| KR | 1020050052847 A | 6/2005 |
| NZ | 505658 | 10/2002 |
| NZ | 505658 | 2/2003 |
| WO | WO 02093839 A2 | 11/2002 |
| WO | WO 2005125250 A1 | 12/2005 |
| WO | WO 2005076557 A1 | 8/2007 |

OTHER PUBLICATIONS

Mitola, et al., "Cognitive Radio: Making Software Radios More Personal," IEEE Xplore Release 2.1, p. 1, http://ieeexplore.ieee.org/xpl/abs_free.jsp?arNumber=788210.

Brodersen, et al., "Corvus: A Cognitive Radio Approach for Usage of Virtual Unlicensed Spectrum," pp. 1-21, http://www.tkn.tn-berlin.de/publications/papers/CR_White_paper_final.pdf.

Chiani, et al., "Ultra Wide Bandwidth Communications towards Cognitive Radio," EMC Europe Workshop, 2005,pp. 114-117, http://www-csite.deis.unibo.it/Staff/giorgetti/pubblicazioni/Conferences/emc05_mcaggl.pdf, Rome, Italy.

Krenik, et al., "Cognitive Radio Techniques for Wide Area Networks," pp. 409-412, http://delivery.acm.org/10.1145/1070000/1065688/p409-krenik.pdf?key1=1065688&key2=8668921411&coll=GUIDE&d1=GUIDE&CFID=70281426&CFTOKEN=36582313.

Atarashi, H., "Broadband packet wireless access appropriate for high-speed and high-capacity throughput," Vehicular Technology Conference, 2001, pp. 566-570, vol. 1, Issue 2001.

Brodersen, Robert W., et al. "Corvus: a cognitive radio approach for usage of virtual unlicensed spectrum." Online. http://www.tkn.tu-berlin.de/publications/papers/CR_White_paper_final.pdf.

Chiani, Marco, et al., "Ultra Wide Bandwidth Communications Towards Cognitive Radio." Online. http://www-csite.deis.unibo.it/Staff/giorgetti/pubblicazioni/Conferences/emc05_mcaggl.pdf.

Johnsson, Martin, "HiperLAN/2—The Broadband Radio Transmission Technology Operating in the 5 GHz Frequency Band," HiperLAN/2 Global Forum, 1999, Version 1.0.

Krenik, William et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.

Mitola, J., et al. "Cognitive Radio: Making Software Radios More Personal," Personal Communications, IEEE, Aug. 1999, vol. 6, Issue 4, pp. 13-18, Stockholm, Sweden, ISSN: 1070-9916.

Okada, M., et al., "Pre-DFT Combining Space Diversity Assisted COFDM," IEEE Transactions On Vehicular Technology, Mar. 2001, pp. 487-496, vol. 50, No. 2, ISSN: 0018-9545.

Pottie, Gregory J., "Wireless Multiple Access Adaptive Communications Techniques," Online. http://www.ee.ucla.edu/~pottie/papers/encycl.pdf.

Tewfik, A.H, et al., "High Bit Rate Ultra-Wideband OFDM," Global Telecommunications Conference, 2002. GLOBECOM apos;02. IEEE, Nov. 2002, pp. 2260-2264, vol. 3.

Wang, Zhengdao, et al., "Complex-Field Coding for OFDM Over Fading Wireless Channels," IEEE Transactions on Information Theory, Mar. 2003, pp. 707-720, vol. 49, No. 3, ISSN: 0018-9448.

Xiaoming She, et al., "Adaptive Turbo Coded Modulation for OFDM Transmissions," Communication Technology Proceedings, 2003. ICCT 2003., Apr. 9-11, 2003, pp. 1491-1495, vol. 2, Beijing, China.

"About SDR Technology," 1 http://www.sdrforum.org/pages/aboutSdrTech/aboutSdrTech.asp, 1 pg, 2007.

"Orthogonal Frequency Division Multiple Access," Wikipedia Online Encyclopedia; retrieved from http://en.wikipedia.org/wiki/ofdma, published Nov. 25, 2006, downloaded on Dec. 12, 2006, pp. 1-3.

"Software defined radio," http://www.wipro.com/webpages/insights/softwareradio.htm, 1 pg, 2007.

"Software Defined Radio", http://www.altera.com/end-markets/wireless/software/sdr/wir-sdr.html, 4 pgs, 2007.

Baumgartner, et al., "Performance of Forward Error Correction for IEEE 802.16e," 10th International OFDM Workshop, Hamburg, Germany, Aug. 2005.

Blestas et al., "Efficient Collaborative (Viral) Communication in OFDM Based WLANs", Proceedings of IEEE/ITS International Symposium on Advanced Radio Technologies (ISART 2003), Institute of Standards and Technology, Boulder Colorado, Mar. 4-7, 2003, pp. 27-32.

Cabric, et al., "A Cognitive Radio Approach for Usage of Virtual Unlicensed Spectrum," In Proc. Of 14th IST Mobile Wireless Communications Summit 2005, Dresden Germany, Jun. 2005, 4 pages unnumbered.

Goeckel, et al., "On the Design of Multidimentional Signal Sets for OFDM Systems," IEEE Transactions on Communications, vol. 50 No. 3, pp. 442-452, Mar. 2002.

Goeckel, "Coded Modulation With Non-Standard Signal Sets for Wireless OFDM Systems," IEEE, pp. 791-795, 1999.

International Search Report from International Application No. PCT/US2007/085556, Search dated Mar. 26, 2008.

International Search Report from International Application No. PCT/US2007/011642, Search dated Sep. 28, 2007.

International Search Report from International Application PCT/US2007/010021, Search dated Oct. 17, 2007.

Lawrey, et al., "Adaptive Frequency Hopping for Multiuser OFDM," Second International Conference on Information, Communications & Signal Processing, ICICS '99, Singapore, Dec. 7-10, 1999.

Li, et al., "Clustered OFDM with Channel Estimation for High Rate Wireless Data," IEEE, 1999, pp. 43-50.

Mitola, III, et al., "Cognitive Radio An Integrated Agent Architecture for Software Defined Radio," *Royal Institute of Technology* (*KTH*), Teleinformatics Electrum 204, SE-164 40 Kista Sweden, pp. title page through 304, May 8, 2000.

Sereni et al., "A Software *Radio OFDM* Transceiver for WLAN Applications," Electronic and Information Engineering Department(DIEI)-University of Perugia—Italy, pp. 1-14, Apr. 2001.

Wahlqvist, et al., "A Conceptual Study of OFDM-based Multiple Access Schemes," Telia, Jun. 5, 1996. http://www.es.lth.se/home/oes/pdfs/etsil.pdf.

Wong, et al., "Multiuser OFDM with Adaptive Subcarrier, Bit, and Power Allocation," *IEEE Journal on Selected Areas in Communications*, vol. 17, No. 10, Oct. 1999, pp. 1747-1758.

Written Opinion from International Application No. PCT/US2007/010020, Search dated Nov. 5, 2007.

Written Opinion from International Application No. PCT/US2007/085556, Search dated Mar. 26, 2008.

Written Opinion from International Application No. PCT/US2007/011642, Search dated Sep. 28, 2007.

Written Opinion from International Application PCT/US2007/010021, Search dated Oct. 17, 2007.

Youngblood, "A Software-Defined Radio for the Masses, Part 1," http://www.ece.jhu.edu/~cooper/SWRadio/Yblood1.pdf, Jul./Aug. 2002, pp. 1-9.

Zhang, et al., "Adaptive OFDM System Design for Cognitive Radio," In: 11th International OFDM-Workshop, Aug. 30-31, 2006, Hamburg, Germany, pp. 91-95, IEEE Communications Society.

Examiner's First Report on Australian patent application No. 2007243348, May 24, 2010.

Office Action in corresponding Chinese Application No. 200780015172.4 dated Dec. 30, 2010.

* cited by examiner

OFDMA BASED ON COGNITIVE RADIO

BACKGROUND OF INVENTION

1. Field of Invention

The invention relates generally to wireless communication and more particularly to a system for efficiently sharing OFDM subchannels.

2. Discussion of Related Art

Frequency Division Multiplexing (FDM) is a well known process by which multiple signals are modulated on different frequency carrier waves. FDM has been used for decades in radio and television broadcast. Radio and television signals are sent and received on different frequencies, each corresponding to a different "channel."

Orthogonal Frequency Division Multiplexing (OFDM) has also been known in the art at least since the late 1960's. In OFDM, a single transmitter transmits on many different orthogonal frequencies simultaneously. Orthogonal frequencies are frequencies that are independent with respect to the relative phase relationship between the frequencies. In OFDM, the available bandwidth is subdivided into a number of equal-bandwidth "subchannels." OFDM is advantageous for wireless communication because it reduces interference or crosstalk between signal transmissions, ultimately permitting data transmission at higher throughput with fewer errors. OFDM is also known as Discrete Multitone Modulation (DMT). OFDM is employed in many standards used today for wireless communication. For example, both the IEEE 802.11a wireless LAN standard and the 802.11g wireless LAN standard rely on an implementation of OFDM for signal transmission. One early reference describing OFDM is R. W. Chang, Synthesis of band-limited orthogonal signals for multi-channel data transmission, Bell System Technical Journal (46), 1775-1796 (1966).

OFDM thus functions by breaking one high speed data stream into a number of lower-speed data streams, which are then transmitted in parallel (i.e., simultaneously). Each lower speed stream is used to modulate a subcarrier. This creates a "multi-carrier" transmission by dividing a wide frequency band (or channel) into a number of narrower frequency bands (or subchannels), each modulated with a signal stream. By sending multiple signal streams simultaneously, each at a lower rate, interference such as multipath or Raleigh fading can be attenuated or eliminated without decreasing the overall rate of transmission.

Orthogonal Frequency Division Multiple Access (OFDMA) is an improvement on OFDM. In OFDMA, different sets of subchannels are assigned to different users. OFDMA is employed today in the DVB-RCT specifications for terrestrial interactive TV networks and in the IEEE 802.16a specifications for broadband wireless access networks. OFDMA was described in H. Sari and G. Karam, "Orthogonal Frequency-Division Multiple Access and its Application to CATV Networks," European Transactions on Telecommunications & Related Technologies (ETT), Vol. 9, No. 6, pp. 507-516, November-December 1998. OFDMA is also known as Multi-user OFDM.

Cognitive radio is a system used for wireless communication in which transmitters and receivers can alter communications parameters based on a variety of factors. A nonexclusive list of these factors includes the nature of the communication being transmitted, the availability of licensed or unlicensed frequencies, user behavior, network state, noise or other interference at particular frequencies, and detection of other users of bandwidth. Cognitive radio is discussed generally in J. Mitola, III and G. Q. Maguire, Jr., "Cognitive Radio: Making Software Radios More Personal," IEEE Personal Communications, 6(4):13-18, August 1999.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

In the claimed invention, aspects of OFDMA and cognitive radio are combined in a novel way to create a system for more efficiently using OFDM subchannels for wireless communication.

Described herein are systems and methods for the implementation of a multiuser scheme allowing for a number of users, sets of user, or carriers to share one or more channels. In the invention, the available channel bandwidth is subdivided into a number of equal-bandwidth subchannels according to standard OFDM practice. The transmitter is informed by an application that it needs to transmit data a particular rate. The transmitter determines the minimum number of subchannels and maximum energy (or noise) threshold for each subchannel necessary to achieve that data rate and selects a set of subchannels matching those requirements. The subchannels need not be contiguous in the spectrum or belong to the same channel. Once the transmitter has selected the required number of subchannels, it begins transmitting simultaneously on those subchannels across the entire bandwidth used by those subchannels.

In one embodiment of the invention, the transmitter uses an Inverse Fourier Transform algorithm to convert signals received in the frequency domain from the application to the time domain for wireless transmission. Preferably, the Fast Fourier Transform algorithm is used. The Inverse Fourier Transform is performed across the entire bandwidth used by the selected subchannels.

Various methods are provided for the receiver to determine which subchannels are in use. In one embodiment, the receiver uses a conventional Fourier transform algorithm, preferably the Fast Fourier Transform to recover the data. The Fast Fourier Transform is similarly performed over the entire bandwidth used by the selected subchannels.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention relates to a novel use of cognitive radio principles in OFDMA transmission. According to the claimed invention, the system selects only those OFDM subchannels that have a low level of noise. The system then transmits data on the selected subchannels, using an Inverse Fourier Transform algorithm across the entire spectrum occupied by the selected subchannels. Thus, several users or sets of users can share the same bandwidth efficiently. The invention may be implemented in hardware or software, or some combination thereof. Embodiments include a system, a method, and instructions stored in a computer-readable medium.

Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the aspects of the present invention discussed below.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1:
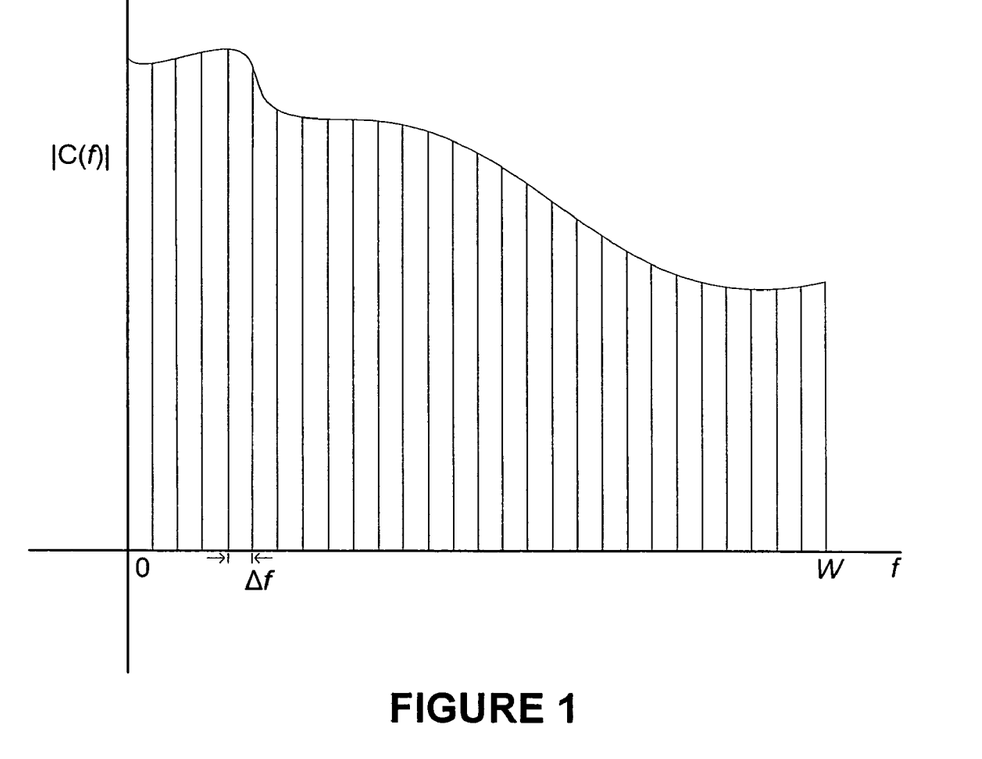
FIG. 1 is a spectrum diagram showing the subdivision of the channel bandwidth to be used into several subchannels of equal width.

As shown in FIG. 1, in OFDM, the available channel bandwidth W is subdivided into a number of equal-bandwidth subchannels. Each subchannel is sufficiently narrow so that the frequency response characteristics of the subchannel are nearly ideal. The number of subchannels is the total available bandwidth divided by the bandwidth of each subchannel. The number of subchannels K can thus be expressed as:

$$K = \frac{W}{\Delta f}$$

Each subchannel k has an associated carrier wave. This carrier wave can be expressed as:

$$x_k(t) = \sin 2\pi f_k t$$

Where $x_k(t)$ is the carrier wave for subchannel k as a function of time t. $f_k$ is the mid-frequency of subchannel k, and k ranges from 0 to K−1.

The symbol rate 1/T is set for each subchannel to be equal to the separation $\Delta f$ of adjacent subcarriers. The subcarriers will thus be orthogonal over the symbol interval T, independent of the relative phase relationship between subcarriers. This relationship can be expressed as:

$$\int_0^T \sin(2\pi f_k t + \phi_k)\sin(2\pi f_j t + \phi_j)\,dt = 0$$

Where $f_k - f_j = n/T$, n=1, 2, ..., independent of the values of the phases $\Phi_k$ and $\Phi_j$.

In an OFDM system, the symbol rate on each subchannel can be reduced relative to the symbol rate on a single carrier system that employs the entire bandwidth W and transmits data at the same rate as the OFDM system. Hence, the symbol interval T (the inverse of the symbol rate) in the OFDM system can be expressed as:

$$T = KT_s$$

Where $T_s$ is the symbol interval of a single-carrier system employing the entire bandwidth W and transmitting data at the same rate as the OFDM system. For example, if the symbol rate across the entire bandwidth for one channel is 72 million symbols per second, and the channel is divided into 48 subchannels, each subchannel would only need to carry 1.5 million symbols per second to achieve the same total data rate. This lower symbol rate reduces inter-symbol interference and thus mitigates the effects of multipath fading. Accordingly, OFDM provides for superior link quality and robustness of communication.

In an OFDM system, the transmitter receives input data in the frequency domain and converts it to a time domain signal. A carrier wave is modulated by the time domain signal for wireless transmission. The receiver receives the signal, demodulates the wave, and converts the signal back to the frequency domain for further processing.

Figure 2:
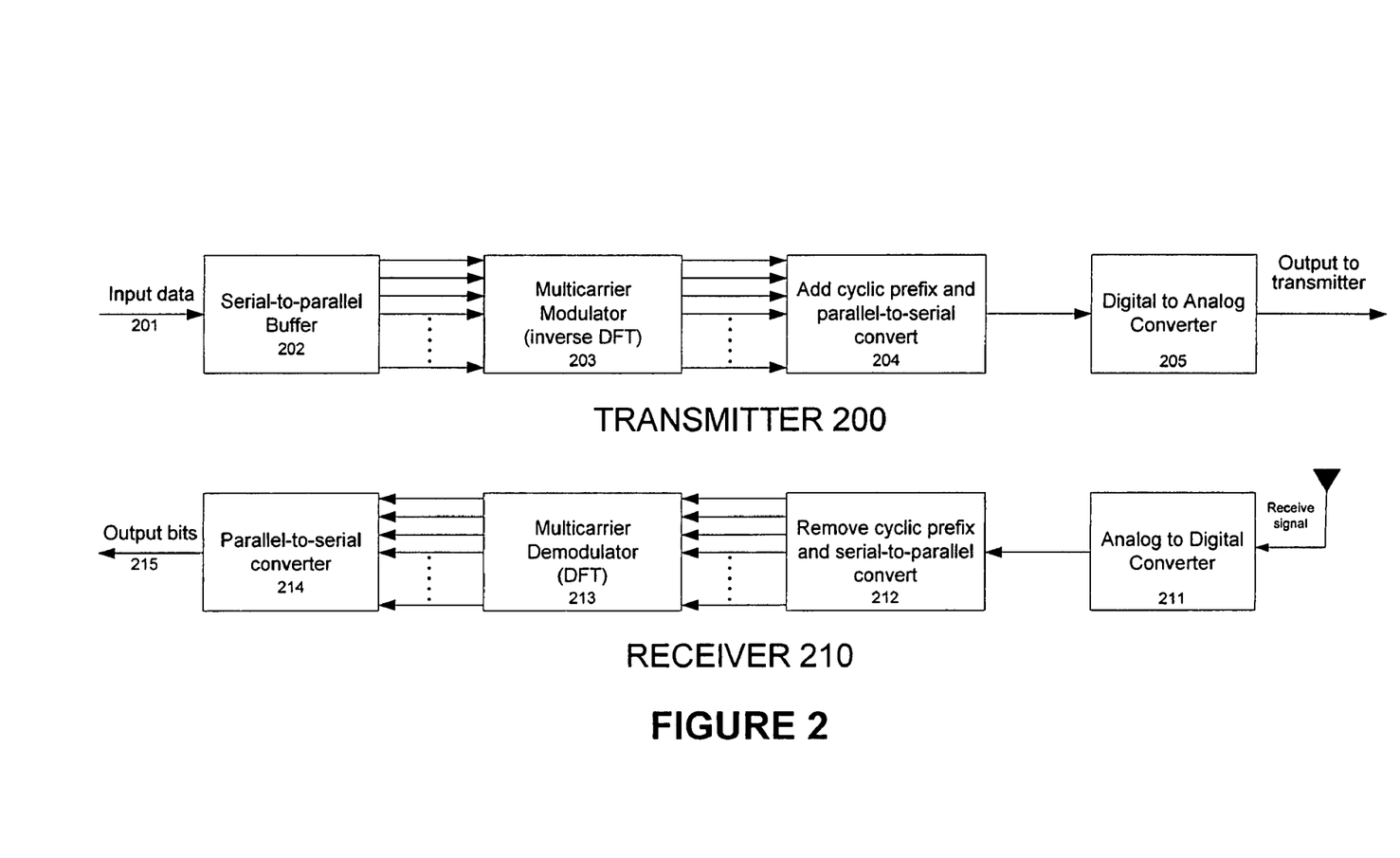
FIG. 2 is a block diagram of a multi-carrier OFDM digital communication system.

A simplified OFDM system is illustrated in FIG. 2. In the illustrated embodiment, the input data stream 201 is provided by the application to the OFDM transmitter 200. In a standard TCP/IP communications stack, this data would be received at the physical layer or data link layer; however, the invention is not limited to any particular source of data or mechanism for providing the data to the transmitter, and could be implemented in hardware or software, and at various layers of the network stack. The input data stream 201 is received by a serial-to-parallel buffer 202. The serial-to-parallel buffer 202 breaks the serial data stream up into several parallel data streams. The number of parallel data streams is equal to the number of subchannels selected for OFDM broadcast, or K as used above. The novel process of selecting channels for OFDM broadcast claimed in this patent is discussed below.

In one embodiment, the serial-to-parallel buffer 202 divides the information sequence received from input data 201 into frames of $B_f$ bits. The $B_f$ bits in each frame are parsed into K groups, where the ith group is assigned $b_i$ bits. This relationship may be expressed as:

$$\sum_{i=1}^{K} b_i = B_f$$

Each of the parallel data streams generated by the serial-to-parallel buffer 202 is then sent to a multicarrier modulator 203. The multicarrier modulator 203 modulates each selected subcarrier with each of the parallel data streams. The multicarrier modulator 203 can be efficiently implemented by use of the Inverse Fast Fourier Transform algorithm to compute the time domain signal, although any algorithm may be used that converts a frequency domain signal to a time domain signal.

The multicarrier modulator 203 may use any modulation scheme to modulate each of the incoming data streams. In a preferred embodiment, the signals are modulated with quadrature amplitude modulation (QAM). Any QAM constellation may be used. For example, the modulator may use 16-QAM, 64-QAM, 128-QAM or 256-QAM. A modulation scheme may be selected based on the required data rate, the available subchannels, the noise on each subchannel, or other factors.

In this example, the multicarrier modulator 203 thus generates K independent QAM subchannels, where the symbol rate for each subchannel is 1/T and the signal in each subchannel has a distinct QAM constellation. According to this example, the number of signal points for the ith subchannel can be expressed as:

$$M_i = 2^{b_i}$$

The complex-valued signal points corresponding to the information signals on each of the K subchannels can be represented as $X_k$, where k=0, 1, ..., K−1. These symbols $X_k$ represent the values of the Discrete Fourier Transform of a multicarrier OFDM signal x(t), where the modulation on each subcarrier is QAM. Since x(t) must be a real-valued signal, its N-point Discrete Fourier Transform $X_k$ must satisfy the symmetry property. Therefore, the system creates N=2K symbols from K information symbols by defining:

$$X_{N-K} = X^*_K, k=1,2,\ldots,K-1$$

$$X'_0 = Re(X_0)$$

$$X_N = Im(X_0)$$

Here $X_0$ is split into two parts, both of which are real. The new sequence of symbols can be expressed as $X_k'$, where k=0, 1, ..., N−1. The N-point Inverse Direct Fourier Transform for each subchannel $x_n$ can thus be expressed as:

$$x_n = \frac{1}{\sqrt{N}} \sum_{k=0}^{N-1} X'_k \exp(j2\pi nk/N) \quad n = 0, 1, \ldots, N-1$$

In this equation, $$\frac{1}{\sqrt{N}}$$

is a scale factor. The sequence $x_n$ where 0<=n<=N−1 thus corresponds to samples of the multicarrier OFDM signal x(t), consisting of K subcarriers.

A cyclic prefix, which acts a guard interval, is added to each of the parallel modulated waves at 204. This guard interval insures that the subchannels will remain orthogonal, even if multipath fading causes the subcarriers to arrive at the receiver with some delay spread. The parallel streams with the cyclic prefix are then merged back into a single serial stream at 204. Finally, the digital data stream is converted to an analog signal 205, and output for wireless transmission.

The transmitted signal can be received by the receiver 210 and processed to recover the original data stream. First, the analog signal is converted back to a digital signal by an analog to digital converter 211. The cyclic prefix is removed and the separate subcarriers are converted back to separate streams at 212. Each parallel data stream is demodulated by a multicarrier demodulator 213, preferably with a Fast Fourier Transform algorithm. Finally, at 214 the parallel streams are reassembled into a single serial stream and output to the receiving device 215.

A key inventive aspect of this system that will be appreciated by one of ordinary skill in the art is the method for selecting the subchannels to be used. This method applies cognitive radio principles to OFDMA. One example of this method is illustrated in FIG. 3.

Figure 3:
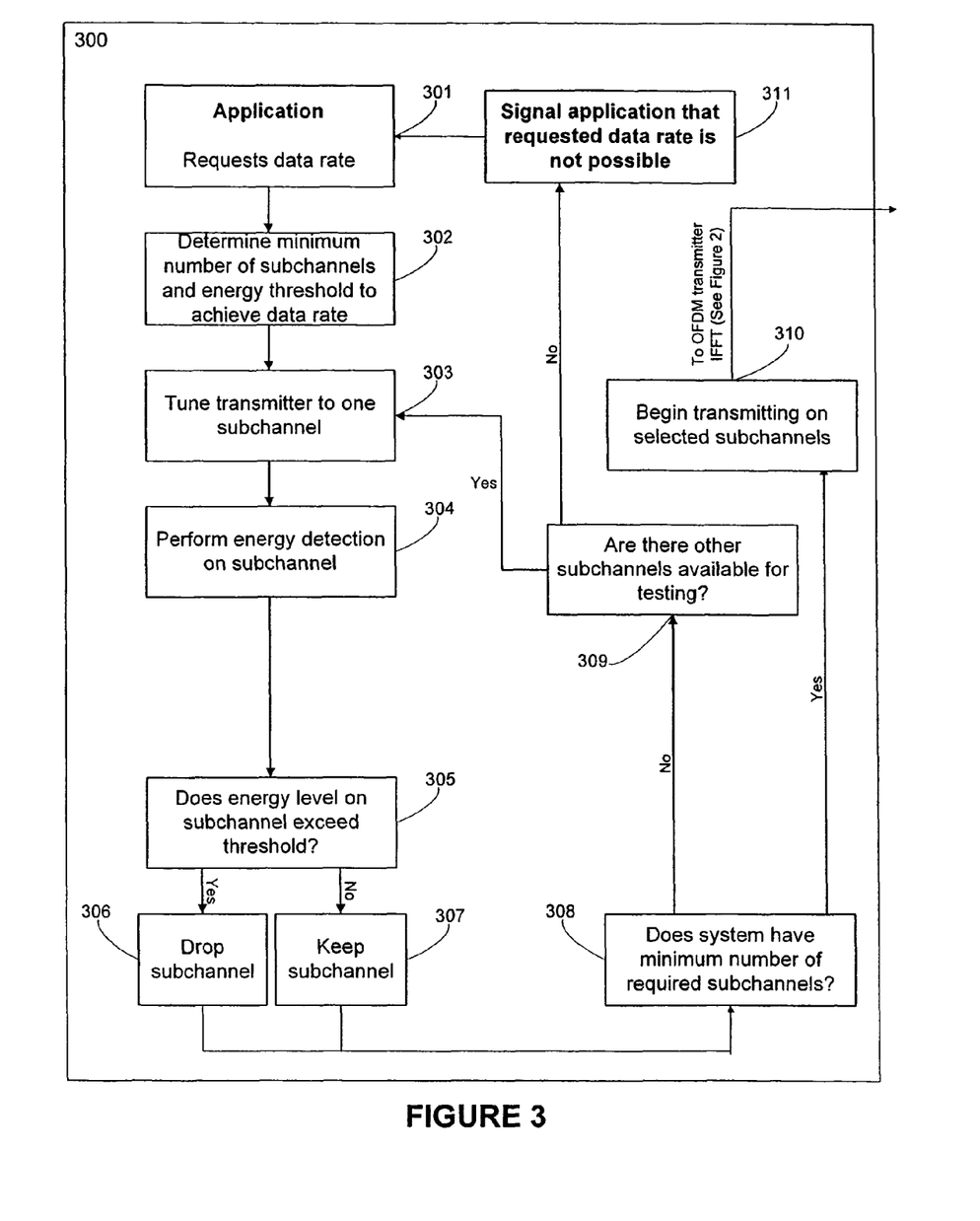
FIG. 3 is a flow diagram illustrating one embodiment of the invention.

FIG. 3 depicts a flowchart illustrating a process that can be utilized by the transmitter to select subchannels to be used. This process could be implemented in hardware or software.

First, an application 301 requests a particular data rate for transmission. This data rate would generally depend on the type of data to be transmitted, but for the purposes of this invention, any arbitrary data rate could be requested.

At 302, the transmitter calculates the minimum number of OFDM subchannels and maximum energy (or noise) threshold for each subchannel that would be necessary to achieve the requested data rate.

The transmitter then begins an iterative process of selecting subchannels to meet the required criteria. At 303, the transmitter tunes to one subchannel from within the spectral range available to it. At 304, the transmitter detects the energy level on that channel. At 305, the transmitter compares the detected energy level with the threshold for that subchannel. If the energy level exceeds the threshold, the subchannel is dropped 306. If it is below the threshold, the subchannel is kept 307.

The system then checks if it has identified a sufficient number of subchannels to meet the requirements at 308. If there are insufficient subchannels, the system checks if there are more subchannels available for testing at 309. If other subchannels are available, the system will return to 303 and test the next available subchannel. If there are no other subchannels available, then the system will signal to the application that the requested data rate is not possible at 311.

Once the system has identified a sufficient number of subchannels, it will then begin transmitting on those selected subchannels at 310. In a preferred embodiment, the Inverse Fourier Transform is performed across the entire bandwidth used by the selected subchannels.

For example, the IEEE 802.11a standard provides for wireless communications in the 5 GHz band of the spectrum. The available spectrum allowed for indoor use in the United States for the 802.11a standard is approximately 5.180 GHz to 5.340 GHz, or 160 MHz wide. That 160 MHz of spectrum is divided up into eight non-overlapping channels, each of which is 20 MHz wide. Each 20 MHz channel may be divided up into 52 subchannels according to OFDM principles, where each subchannel is approximately 300 KHz wide. In this example there would thus be 416 narrowband subchannels that could be used for transmission. To achieve the required data rate, the transmitter could select 20 subchannels that do not exceed a certain threshold for noise or interference. If those subchannels are spread across the first three 20 MHz channels, the transmitter would perform an Inverse Fourier Transform algorithm on the signals across that entire 60 MHz bandwidth. Note that the invention is not limited to any part of the spectrum, any number of subchannels, or any standard for communication.

In an alternative embodiment of the invention, rather than checking the energy level on each subchannel individually as depicted in FIG. 3, the system could check several subchannels at once, or detect energy on all of the subchannels in the entire available spectrum at one time, and then discard the subchannels that exceed the energy threshold.

Various methods may be used by the receiver to determine the subchannels in use. In one embodiment, the receiver performs the same energy detection as the transmitter to identify the correct subchannels. In another embodiment, the receiver receives a signal on a known frequency from the transmitter indicating which subchannels have been selected for transmission. In either of these embodiments, the receiver could perform a conventional Fast Fourier Transform to recover the data. As with the transmitter, the receiver would perform the Fast Fourier Transform across the entire bandwidth used by all of the selected subchannels.

In another embodiment of the invention, if two or more transmitters interfere with each other on a given subchannel, each transmitter can associate a random timer with that subchannel. Each transmitter then waits for the end of the random timer on the subchannel before checking the energy level on the subchannel again. If the transmitter detects noise on the subchannel, it will drop the subchannel. If it detects that the subchannel is clear, it will keep the subchannel. Because each transmitter waits a different length of time before checking the energy level again, all but one of the transmitters will drop the subchannel. In this embodiment, two or more transmitters can select a different subset of the available subchannels.

Figure 4:
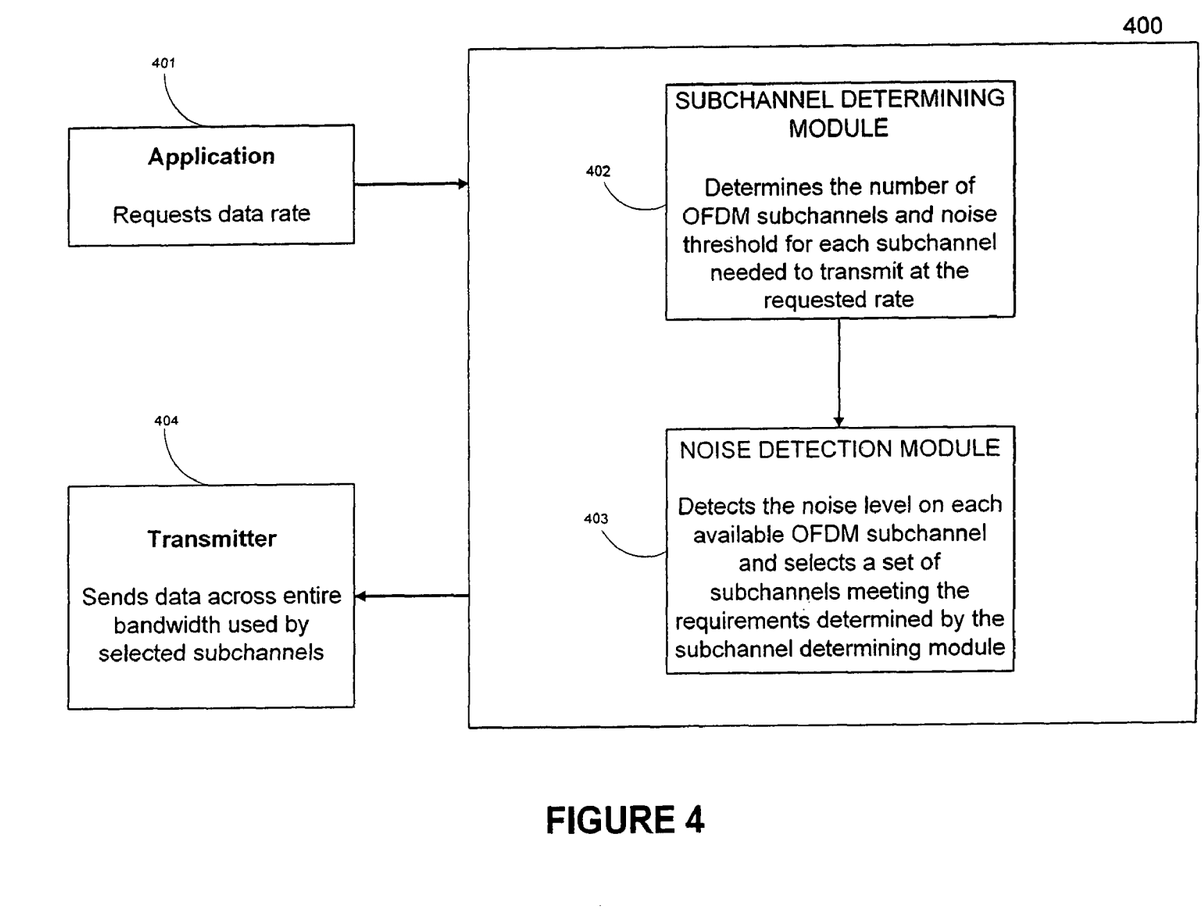
FIG. 4 is a diagram of a system that implements some aspects of the invention.

FIG. 4 illustrates another embodiment of the invention. This figure shows a system 400 that that accepts a data rate from an application 401 and provides information to an OFDM transmitter 404 as to how it will transmit data. The system 400 comprises a subchannel determining module 402 and a noise detection module 403. The subchannel determining module 402 determines the total number of OFDM subchannels and the noise threshold for those subchannels that would be necessary to achieve the data rate requested by the application 401. The noise detection module 403 tests the noise level on each available OFDM subchannel, selecting a set of subchannels such that the total number of subchannels selected meet the requirements determined by the subchannel determining module 402. The identity of the selected subchannels is then provided by the system 400 to the transmitter 404, which can then begin transmitting over OFDM, using an Inverse Fourier Transform algorithm over the entire bandwidth occupied by the selected subchannels. In an alternative embodiment, a separate module selects the set of subchannels meeting the requirements determined by the subchannel determining module, relying on data provided by a noise detection module.

In yet another embodiment, the invention relates to a computer-readable medium having computer-executable instructions for performing steps. The steps include calculating the number of OFDM subchannels and noise threshold for each subchannel necessary to achieve a requested data rate and selecting those OFDM subchannels for which the noise level is less than the noise threshold.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of wireless communication between two or more devices at a data rate, the method comprising:
   a) receiving a request for communication at the data rate;
   b) determining a minimum number of OFDM subchannels and energy threshold for each subchannel necessary to achieve the data rate; and
   c) selecting a set of the OFDM subchannels;
   d) tuning a transmitter to one or more of the subchannels in the set; and
   e) performing energy detection on one or more subchannels from said set of OFDM subchannels; and
   f) dropping any subchannels from said set of OFDM subchannels whose energy level exceeds the threshold; and
   g) comparing the number of OFDM subchannels in the set after dropping in (f) to the determined minimum number of OFDM subchannels; and
   h) when the comparing in (g) indicates that the set contains less than the determined minimum number of OFDM subchannels, adding one or more subchannels to said set of OFDM subchannels; and
   i) repeating (f) through (h) until the comparing in (g) indicates that set contains the determined minimum number of OFDM subchannels; and
   j) transmitting on a channel consisting of the set of OFDM subchannels.

2. The method of claim 1, wherein the set of OFDM subchannels selected in (c) comprises at least the minimum number of OFDM subchannels necessary to achieve the data rate.

3. The method of claim 1, wherein the energy detection in step (e) is performed on the entire set of OFDM subchannels selected in (c).

4. The method of claim 1, wherein the two or more devices comprise a transmitter and a receiver and the receiver determines the set of OFDM subchannels to be used by performing (c) through (i).

5. The method of claim 1, wherein the two or more devices comprise a transmitter and a receiver and the transmitter sends a signal to the receiver indicating the set of OFDM subchannels the transmitter has selected.

6. The method of claim 1, further comprising a step of transmitting to a receiver an identity of the selected OFDM subchannels, the identity being transmitted on a predetermined frequency.

7. A wireless communication system for transmitting data, the system including a plurality of communication devices that share a plurality of OFDM subcarriers, each of the communication devices executing an application that defines a data rate for transmission, the system comprising:
   in each of the plurality of communication devices:
   a) a subchannel determining module to receive a request for communication at the data rate, and to determine a minimum number of OFDM subcarriers needed to achieve the data rate and an energy threshold for determining whether an OFDM subcarrier is available; and
   b) a signal-to-noise level detection module to detect the signal-to-noise level on each OFDM subcarrier, to determine whether an OFDM subcarrier is available by determining whether the signal-to-noise level of the OFDM subcarrier is below the energy threshold determined by the subchannel determining module, and to select a set of available OFDM subcarriers; and
   c) a transmitter that, when a number of subcarriers selected for the set by the signal-to-noise detection module meets the minimum number of OFDM subcarriers determined by the subchannel determining module, transmits data generated by the application over the set of subcarriers while a second transmitter in a second of the plurality of communication devices transmits on a second, disjoint set of subcarriers of the plurality of OFDM subcarriers, wherein, in each of the plurality of communication devices, when the number of subcarriers selected for the set by the signal-to-noise detection module does not meet the minimum number of OFDM subcarriers determined by the subchannel determining module, provides an indication is provided to the application that the data rate is not achievable.

8. The system of claim 7, wherein the signal-to-noise level detection module tests each OFDM subcarrier sequentially.

9. The system of claim 7, wherein the signal-to-noise level detection module tests all OFDM subcarriers simultaneously.

10. The system of claim 7, wherein the signal-to-noise level detection module in a first of the communication devices relies on feedback from a second of the communication devices.

11. The system of claim 7, wherein a first of the communication devices sends a signal to a second of the communication devices indicating a list of subcarriers to be used for communication between the first communication device and the second communication device.

12. A computer-readable storage medium, the computer readable storage medium not being a signal per se, having computer-readable signals stored thereon that define instructions that, as a result of being executed by a computer, instruct the computer to perform a method of wireless communication, the method comprising:
   a) receiving a request from an application for transmission according to a requested data rate;
   b) calculating a number of OFDM subchannels and noise threshold for each subchannel that provides the requested data rate; and
   c) when the number of subchannels with a noise level less than the threshold is greater than the number of subchannels, selecting a set of OFDM subchannels for which the noise level is less than said noise threshold; and
   d) when the number of subchannels with a noise level less than the threshold is less than the number of subchannels, providing an indication to an application that the requested data rate is not achievable.

13. The computer-readable storage medium of claim 12, wherein the method further comprises transmitting data over the entire bandwidth used by the selected OFDM subchannels using an Inverse Fast Fourier Transform algorithm.

14. The computer-readable storage medium of claim 12, wherein the method further comprises receiving data over the entire bandwidth used by the selected OFDM subchannels using a Fast Fourier Transform algorithm.

15. The computer-readable storage medium of claim 12, wherein the method further comprises transmitting from the computer to a second computer acting as a receiver of data from the application an identity of the selected OFDM subchannels.

16. The computer-readable storage medium of claim 15, wherein the transmission of the identity of the selected OFDM subchannels occurs at a different frequency than that used for transmission of data.

17. The computer-readable storage medium of claim 12, wherein the wireless communication transmits data modulated by quadrature amplitude modulation.

18. The method of claim 1, wherein dropping a noisy subchannel in step f) comprises establishing a randomly-selected time interval during which the noisy subchannel is marked as dropped, and
   wherein selecting the set of OFDM subchannels in step c) comprises selecting subchannels in part based on whether a subchannel is marked as dropped and blocking selection of a subchannel marked as dropped until the end of the randomly-selected interval for the subchannel.

19. The system of claim 7, wherein when the signal-to-noise level detection module determines that a signal-to-noise level of a noisy OFDM subcarrier is above the energy threshold determined by the subchannel determining module, the signal-to-noise level detection module establishes a randomly-selected time interval during which the noisy OFDM subcarrier is marked as dropped, and
   wherein the signal-to-noise level detection module refrains from detecting the signal-to-noise level on an OFDM subcarrier marked as dropped until the end of the randomly-selected interval for the OFDM subcarrier.

* * * * *